March 12, 1968  R. B. KIRKWOOD  3,372,544
MEANS FOR PRESETTING AND TESTING A DESIRED PRESSURE
LIMIT FOR HYDRAULICALLY REGULATED REFINER
Filed Aug. 15, 1966
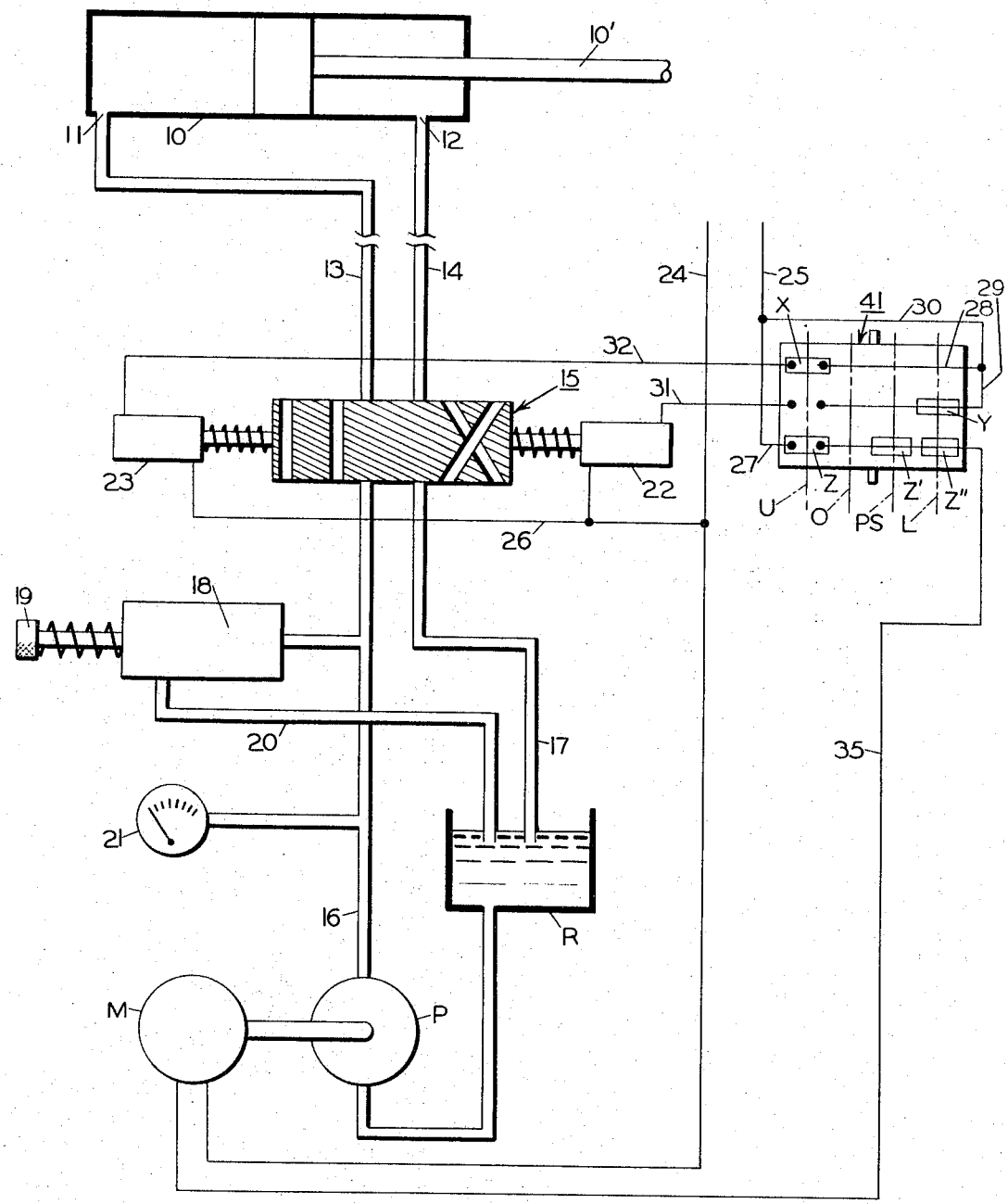
INVENTOR.
ROBERT B. KIRKWOOD
BY *F. R. Geisler*
ATTORNEY

United States Patent Office 3,372,544
Patented Mar. 12, 1968

3,372,544
MEANS FOR PRESETTING AND TESTING A DESIRED PRESSURE LIMIT FOR HYDRAULICALLY REGULATED REFINER
Robert B. Kirkwood, Portland, Oreg., assignor to Morden Machines Company, Portland, Oreg., a corporation of Oregon
Filed Aug. 15, 1966, Ser. No. 572,343
2 Claims. (Cl. 60—52)

This invention concerns refining machines for treating fibrous materials, particularly pulp material, in which the material receives refining treatment by passing between rotating and non-rotating elements which have opposed attritioning surfaces. In such refining machines one of the elements, for example the non-rotating element or stator, is so mounted as to be axially adjustable in order that the spacing between the opposed rotating and non-rotating attritioning surfaces may be adjusted as desired. The invention relates in general to hydraulic means for adjusting the spacing.

In one type of adjusting system for refining machines the attritioning elements and surfaces are adjusted to a desired relative position which is then constantly maintained for a particular operation regardless of changes in the back pressure of the stock against the attritioning surfaces, and consequently regardless of changes in the consistency or nature of the stock passing between the attritioning surfaces, or changes in the flow rate at which the stock is fed to the refiner. In another type of adjusting system a constant definite pressure is maintained by the opposed attritioning surfaces against the stock passing between them, and consequently the actual spacing between the opposed surfaces varies automatically with fluctuations in the back pressure of the stock caused by fluctuations in the consistency of the stock or in the flow rate. The present invention relates specifically to a hydraulic control system of the latter mentioned type.

In a hydraulic control system of the constant pressure-variable gap type a desired maximum pressure is pre-determined and this maximum pressure is thereafter maintained during the particular operation with the aid of a pressure relief valve in the line between the hydraulic pump and the cylinder or cylinders through which the varying positioning of the axially movable attritioning element is accomplished. At the end of the operation the pressure in the control system is lowered for the unloading of the refiner.

A regular procedure at the time of the loading of the refiner is for the operator to adjust the control for the pressure relief valve while watching the pressure gauge on the hydraulic line until the desired predetermined pressure is obtained, whereupon the control for the pressure relief valve is definitely set. When the same maximum pre-determined pressure is desired for subsequent operations the operator leaves the control for the pressure relief valve at its previous setting. This procedure has two objectionable features. The first setting of the control for the pressure relief valve for the desired pre-determined pressure requires several minutes for the entire hydraulic system to complete its cycle until the pressure has been built up to the desired maximum and during this time the operator must watch the pressure gauge and then set the control for the relief valve accordingly. When subsequent operations of the refiner at the same preset maximum pressure are desired the operator relies on the previous setting of the control for the pressure relief valve. However, if in the meantime the pressure control knob has been tampered with, the pressure may build up beyond the desired maximum, and if the operator, relying upon the previous setting, does not observe this in time to readjust the pressure quickly, the build-up in pressure may continue to the point where damage to the attritioning surfaces may result.

The object of this invention is to provide means in a refining machine hydraulic system through which the presetting of the pressure control or the testing of the previous setting of the pressure control can be accomplished quickly and easily in advance of and without the necessity of having the entire hydraulic system activated.

The way in which this object is attained with the means of the present invention and the arrangement and manner of operation of such means will be readily understood from the following brief description and explanation in which reference is to be made to the accompanying diagrammatic drawing.

In the drawing, one of the double-acting identical hydraulic cylinders which are employed for adjusting the position of the axially movable element of the refiner (not shown) is indicated by the reference character 10, the piston rod 10' from the piston in the cylinder (as well as the piston rods from the other cylinder or cylinders) being connected with such axially movable element.

Hydraulic fluid is delivered through the line 16 by means of a pump P which draws hydraulic fluid from the reservoir R. The return line to the reservoir R is indicated at 17. The pump is operated by a motor M. A pressure relief valve 18 is connected to the line 16, and the setting of this relief valve is done by means of a control knob 19. Thus when the pressure in line 16 rises above the amount for which the relief valve 18 is set, a discharge of fluid into the reservoir R through the line 20 takes place to keep the pressure at the set level. A gauge 21 is connected with the line 16 for indicating the pressure.

Valve 15, which is a common type of control valve, is shown in the drawing in neutral position, thus preventing the passage of hydraulic fluid in either direction through the lines 13 and 14 and preventing any movement of the piston rod 10'. As is obvious, shifting of the valve 15 either to the right or to the left, as viewed in the figure, with the pump P being operated, will cause hydraulic fluid to be delivered into the line 13 or into the line 14 respectively, as the case may be. The valve 15 is operated by means of a pair of solenoids 22 and 23 so arranged that actuation of solenoid 22 will cause the valve 15 to be shifted to the right and actuation of the solenoid 23 will cause the valve to be shifted to the left.

The electric current lines 24 and 25 lead from an electric power supply source, line 24 leading directly to one terminal of the motor M. A branch line 26 connects the solenoids 22 and 23 to the line 24.

A four position selector or drum switch is schematically indicated as a whole by the reference 41. This selector switch is provided with circuit-closing contact elements X, Y, Z, Z' and Z", arranged in the manner indicated for contacting pairs of stationary brushes at line terminals. Thus the contact element X, in one position of the switch 41, connects the terminals of the lines 32 and 28, and contact element Z, with the same position of switch 41, connects the terminals of the lines 35 and 25. Contact elements Z' and Z" in other positions of the switch also connect the terminals of the lines 35 and 25, and contact element Y in one position of the switch connects the terminals of the lines 31 and 29. Lines 31 and 32 connect with the solenoids 22 and 23 respectively as shown; line 27 is connected with current line 25; lines 28 and 29 are connected through line 30 with current line 25, and line 35 leads to one terminal of the pump motor.

The four positions to which this special selector switch 41 can be turned are indicated by the notations U, O, PS and L. Thus in the U position the selector switch will cause the line 32 to be connected with the line 28, and thence through line 30 to current line 25, resulting in activation of solenoid 23, and in this position the selector switch will also cause line 35 to be connected with the line 27 and thence with current line 25, resulting in operation of the motor or M and pump P. In the O position of the selector switch 41 all contacts will be open and thus the valve 15 will be in the neutral or closed position as shown in the drawing and the motor and pump will not operate. In the PS position of the selector switch the line 35 will be connected with the line 27 and thence with current line 25 resulting in operation of the motor and pump, but, since neither solenoid 22 nor 23 will be activated, the valve 15 will remain in neutral or closed position. Finally, in the N position of the selector switch the line 31 will be connected with the line 29 and thence through line 30 to current line 25, causing solenoid 22 to be activated, and also the line 35 will be connected through the line 27 with line 25, resulting in operation of the motor and pump.

In other words, when the refining machine is to be "loaded" to a desired pressure, the selector switch 41 is turned to the L position; when the refining machine is to be "unloaded" at a lowered pressure, the selector switch is first turned to the U position and then to the O or off position, in which position the motor pump will be inoperative and the hydraulic lines 13 and 14 will be closed due to the fact that the control valve is in neutral or closed position.

In general, the arrangement as described, either for loading or unloading the refining machine and also for placing the hydraulic control system entirely in the off position, is old. Heretofore the customary procedure with the loading of the refiner would be to operate the switch means to activate solenoid 22, causing control valve 15 to move to the right (as viewed in the drawing), and simultaneously to cause the pump P to be operated, thus resulting in hydraulic fluid under pressure being driven into the cylinder 10 through port 11 and fluid on the opposite side of the piston being discharged from port 12. It the control knob 19 for the pressure relief valve 18 had not been preset by the operator, he would watch the reading on the pressure gauge 21 and set the relief valve control when the desired pressure had been reached. Since the operation of the positioning cylinders and the resulting axial movement of the movable attritioning element in the refiner takes place very gradually, the operator had to wait until the reading on the gauge showed the predetermined desired pressure and then set the control for the relief valve. If the control had been previously set, but if the control knob had been tampered with in the meantime, this would not be immediately apparent to the operator, even if he were standing by.

In the present invention, the selector switch 41 is specially arranged so as to provide for a separate PS position, and when the switch 41 is turned to this position the motor and pump will be operated but the valve 15 will be maintained in neutral, closed position.

The manner in which the invention is carried out will now be apparent. Assuming that the switch 41 had first been turned to U (unloading) position, enabling the refining machine to be unloaded at low pressure and that the switch assembly 41 has then been placed in the O (off) position, causing the control valve to be in the neutral or closed position as indicated in the drawing, the operator, in order either to set the device for the desired pre-determined pressure or else to test a previous setting, turns the switch 41 to the PS (pressure preset) position. This results in causing the pump P to operate and to continue operation as long as the switch remains in this PS position. However, since the control valve 15 cannot shift while the switch is in this position, all flow of hydraulic fluid is blocked at the valve 15. The volume of hydraulic fluid in the system between the pump P and the closed valve 15 is relatively very small and the operation of the pump on this small, blocked volume of hydraulic fluid causes the pressure in the same to build up rapidly. The operator, watching the rapid pressure rise shown by the gauge 21, can set the control knob 19, or reset the control knob as the case may be, as soon as the gauge shows that the desired maximum pressure has been reached.

Thus the present invention enables the pre-setting, or the testing of the previous presetting, of the pressure control for the system to be accurately done in only a fraction of the time previously required and makes it practical to check a previous presetting with each operation of the refiner. In other words, the use of the invention enables the set-up of the refiner to be accomplished in less time and, on the other hand, also eliminates a possible cause of considerable damage.

I claim:

1. In a hydraulic system for positioning an axially-adjustable element in a fibrous material refining machine by the maintenance of a desired constant pressure, a double-acting hydraulic cylinder, a hydraulic pump and pump motor, a flow control valve in the hydraulic lines for said cylinder, a pressure relief valve and a pressure gauge in the delivery line between said pump and said flow control valve, a control element for setting said pressure relief valve, electric means for selectively moving said flow control valve from neutral closing-off position, switch means controlling the operation of said electric means and controlling a main circuit to said pump motor so arranged as to close said circuit to said pump motor whenever said control valve is moved from neutral closing-off position by said electric means, and associated testing switch means for closing a circuit to said motor while said electric means is inactive and said control valve is in neutral closing-off position, whereby the utilization of said testing switch means will cause said pump temporarily to be operated while said flow control valve is maintained in said neutral closing-off position, thereby enabling the pressure in the hydraulic fluid delivery line between said pump and said flow control valve to build up quickly for the setting of said pressure relief valve and the establishing of maximum pressure for the entire system in advance of activating the system.

2. In a hydraulic system for positioning an axially adjustable element in a fibrous material refining machine by the maintenance of a desired constant pressure, a double-acting hydraulic cylinder, a hydraulic pump and pump motor, a flow control valve in the hydraulic lines for said cylinder, a pressure relief valve and a pressure gauge in the delivery line between said pump and said flow control valve, a control element for setting said pressure relief valve, means including a pair of solenoids for selectively moving said flow control valve from neutral closing-off position, a switch assembly, means in said switch assembly for controlling the selective activation of said solenoids and simultaneously controlling the circuit to said pump motor so arranged that said circuit to said pump motor will be closed and said pump caused to operate whenever either of said solenoids is activated, and a pressure-testing switch device incorporated in said switch assembly so arranged as to close said circuit to said pump motor independently while solenoids are inactive, whereby the utilization of said pressure-testing switch device of said switch assembly will cause said pump temporarily to be operated while said flow control valve is maintained in neutral closing-off position, thereby enabling the pressure in the hydraulic fluid delivery line between said pump and said flow control valve to build up quickly for the setting of said pressure relief valve and the establishing of maximum pressure for the entire system in advance of actuating the system.

No references cited.

EDGAR W. GEOGHEGAN, *Primary Examiner.*